(12) United States Patent
Compton et al.

(10) Patent No.: US 7,630,407 B2
(45) Date of Patent: Dec. 8, 2009

(54) FREQUENCY SYNCHRONISATION OF CLOCKS

(75) Inventors: Matthew Compton, Winchester (GB); Stephen Charles Olday, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 996 days.

(21) Appl. No.: 10/371,902

(22) Filed: Feb. 20, 2003

(65) Prior Publication Data

US 2003/0174734 A1    Sep. 18, 2003

(30) Foreign Application Priority Data

Feb. 22, 2002    (GB)    ................................. 0204242.2

(51) Int. Cl.
*H04J 3/06*    (2006.01)

(52) U.S. Cl. ........................ 370/509; 370/516; 375/355; 375/356

(58) Field of Classification Search ................. 370/509, 370/503, 516; 375/356
See application file for complete search history.

(56) References Cited

U.S. PATENT DOCUMENTS

| | | | |
|---|---|---|---|
| 5,381,181 A | | 1/1995 | Deiss |
| 5,544,150 A | * | 8/1996 | Fujimoto et al. ............. 370/248 |
| 5,550,873 A | * | 8/1996 | Dolev et al. ................. 375/354 |
| 5,566,180 A | * | 10/1996 | Eidson et al. ................ 370/473 |
| 5,689,688 A | * | 11/1997 | Strong et al. ................ 713/375 |
| 5,784,421 A | * | 7/1998 | Dolev et al. ................. 375/354 |
| 5,966,387 A | | 10/1999 | Cloutier |
| 5,995,570 A | * | 11/1999 | Onvural et al. .............. 375/356 |
| 6,049,886 A | | 4/2000 | Motoyama |
| 6,144,714 A | | 11/2000 | Bleiweiss et al. |
| 6,148,051 A | * | 11/2000 | Fujimori et al. ............. 375/356 |
| 6,278,710 B1 | * | 8/2001 | Eidson ........................ 370/394 |
| 6,449,291 B1 | * | 9/2002 | Burns et al. ................. 370/516 |
| 6,470,032 B2 | * | 10/2002 | Dudziak et al. ............. 370/503 |
| 6,744,789 B1 | * | 6/2004 | Michener .................... 370/509 |
| 6,842,463 B1 | * | 1/2005 | Drwiega et al. ............. 370/468 |
| 6,975,652 B1 | * | 12/2005 | Mannette et al. ............ 370/503 |
| 6,975,653 B2 | * | 12/2005 | Eidson ........................ 370/503 |
| 6,975,655 B2 | * | 12/2005 | Fischer et al. ............... 370/516 |
| 2002/0136232 A1 | * | 9/2002 | Dudziak et al. ............. 370/445 |
| 2002/0186716 A1 | * | 12/2002 | Eidson ........................ 370/503 |

FOREIGN PATENT DOCUMENTS

| | | |
|---|---|---|
| JP | 2000-332802 | 11/2000 |
| JP | 2001-186180 | 7/2001 |
| WO | WO 02 09331 | 1/2002 |

* cited by examiner

*Primary Examiner*—Bob A Phunkulh
(74) *Attorney, Agent, or Firm*—Oblon, Spivak, McClelland, Maier & Neustadt, L.L.P.

(57) ABSTRACT

The frequency of a local clock of a local data processor in communication with an asynchronous switched packet network is synchronized to the frequency of a reference clock of a source data processor also coupled to the network. Timing packets each including a field containing the destination address of the local processor and a field containing reference clock data indicating the time at which the packet is launched onto the network are sent to the local data processor from the source data processor across the network. The frequency of the local clock is controlled in dependence on the reference clock data and the times of arrival of the packets.

27 Claims, 4 Drawing Sheets

Fig. 1

| Second, RX, diff. | 6 | 9 | 7 | |
|---|---|---|---|---|
| First, TX, diff. | 5 | 8 | 6 | Fig. 2 |
| Error | 1 | 1 | 1 | |
| Cumulative Error | 1 | 2 | 3 | |

Fig. 3: UDP Timestamp Packet

Fig. 7: Video Packet

Fig. 8: Combined Packet

Fig. 4: Frequency Locking System

Fig. 5: Clock Difference Circuit

Fig. 6: Accumulator

FREQUENCY SYNCHRONISATION OF CLOCKS

BACKGROUND OF THE INVENTION

1. Field of the Invention

The present invention relates to the frequency synchronisation of clocks. Embodiments of the invention relate to frequency synchronisation of clocks over an asynchronous switched network.

2. Description of the Prior Art

It has been proposed to distribute, over an asynchronous switched network, data which is generated at a source synchronously with a reference clock. The data may be distributed to many receivers which process the data independently of each other. However the received data needs to be processed synchronously with a local clock in a receiver and that local clock needs to be synchronous with the reference clock. An example of such data is video. There are other examples of such data. An example of such a network is an Ethernet network. There are other examples of such networks.

A prior proposal demonstrated at NAB 2001 distributed video data over a network. Timing data linking local clocks to a reference clock was distributed over another, separate, network It is desired to provide synchronisation via the network.

ITU-T Rec H222.0 (1995E) discloses that within the ITU-T Rec H222.01 ISO/IEC 13818-1 systems data stream (i.e. MPEG) there are clock reference time stamps called System Clock References (SCR). The SCRs are samples of the System Time Clock (STC). They have a resolution of one part in 27 MHz and occur at intervals of upto 100 ms in Transport Streams and upto 700 ms in Program Streams. Each Program Stream may have a different STC. The SCR field indicates the correct value of the STC of an encoder at the time the SCR is received at a corresponding decoder. With matched encoder and decoder clock frequencies, any correct SCR value can be used to set the instantaneous value of the decoders STC. This condition is true provided there is no discontinuity of timing for example the end of a Program Stream. In practice the free running frequencies of the clocks will not be matched. Thus there is a need to slave the clock of the decoder to that of the encoder using a Phase Locked Loop (PLL). At the moment each SCR arrives at the decoder it is compared with the STC of the decoder. The difference (SCR-STC) is an error which is applied to a low pass filter and gain stage to generate a control value for the voltage controlled oscillator which is the clock of the decoder.

The system described above uses a synchronous network and locks the absolute time of the decoder clocks to the reference clock.

The present invention seeks to synchronise the frequencies of clocks of data processors linked by an asynchronous packet switched network without requiring infrastructure additional to the network.

SUMMARY OF THE INVENTION

According to one aspect of the present invention, there is provided a method of synchronising the frequency of a local data processor coupled to an asynchronous switched packet network to the frequency of a reference clock of a source data processor also coupled to the network, the method comprising the steps of: sending, to the local data processor from the source data processor across the network, timing packets each including a field containing the destination address of the local processor and a field containing reference clock data indicating the time at which the packet is sent; and controlling the frequency of the local clock in dependence on the reference clock data and the times of arrival of the packets.

Sending timing packets over the network allows the clocks to be synchronised without requiring infrastructure additional to the network. By using, as the reference clock data, data which is that current at the time at which the packet is sent (launched onto the network) the effect of any processing delay or jitter in the source data processor is reduced. For example, a timing packet generator creates a timing packet with an empty time data field. At (or just before) the moment at which the packet is launched onto the network, the reference time is sampled and the time is put into the time data field.

The timing packets may be independent of packets of the data processed by the source data processor and the local data processor. That allows amongst other possibilities all processors on the network to have synchronised clocks whilst allowing data to be sent between selected ones of the processors.

Alternatively, the packets may include both timing data and the said data processed synchronously with the reference clock.

The source data processor may send to the local data processor, across the network, data packets containing at least the address of the local processor and data which is produced synchronously with the reference clock, the timing packets being sent independently of the data packets. Most preferably the source data processor senses when the network has capacity to send the timing data packets and sends them when the said capacity exists.

Preferably, the local clock is controlled in dependence on an error signal which is dependent on the difference between a) the difference between the reference clock data in successively received timing packets and b) the difference between local clock data indicating the local clock time at the times of receipt of the said timing packets. The error signal is updated each time a timing packet is received. Calculating the error signal in this way has the advantage that any discontinuity in the timing packets (for example a packet is not sent or not received) that has no long term effect on the error signal (except that the error signal is not updated for a longer period of time). Also this reduces, if not eliminates the effect of a fixed delay in the processing of the timing packets by the network. Furthermore if the network delay changes then the error signal is affected only at the time of the change and not thereafter.

In an embodiment of the invention, the reference and local clock ticks are counted by reference and local counters. A phase difference between the reference and local counts has no effect on the error signal. These advantages are explained in more detail hereinbelow.

The method may further comprise the step of low pass filtering the said error signal. This reduces the effect of jitter on the error signal. Furthermore the method preferably further comprises the step of accumulating the filtered error signal and controlling the local clock in dependence on the accumulated error signal. This ensures that when the error signal is zero (i.e. the clocks have equal frequencies) the local clock then does not vary in frequency due to the zero control signal. These advantages are explained in more detail hereinbelow.

According to another aspect of the present invention, there is provided a data packet for use in an asynchronous switched network, the packet including at least a destination address of a processor including a local clock and a field containing a reference clock data indicating the time at which the packet is launched onto the network.

According to a further aspect of the invention, there is provided a data processor comprising a reference clock, a source of data processed synchronously with the reference clock, a generator of timing packets each of which contain reference clock data and an address field containing address data indicating the destination of the packet, and an interface for sending the timing packets across an asynchronous switched network, the reference clock data indicating the time at which the timing packet is sent across the network.

According to a yet further aspect there is provided a data processor comprising a local clock, an interface for receiving, from an asynchronous switched network, timing packets which contain timing data each indicating a reference clock time at the time the packet was sent across the network and an address field containing address data indicating the address of the data processor, and for passing the timing data to a control system for controlling the frequency of the local clock in dependence on the reference clock data and the times of arrival of the timing packets at the processor.

These and other aspects of the invention are set out in the claims to which attention is directed.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

FIRST EXAMPLE

Figure 1:
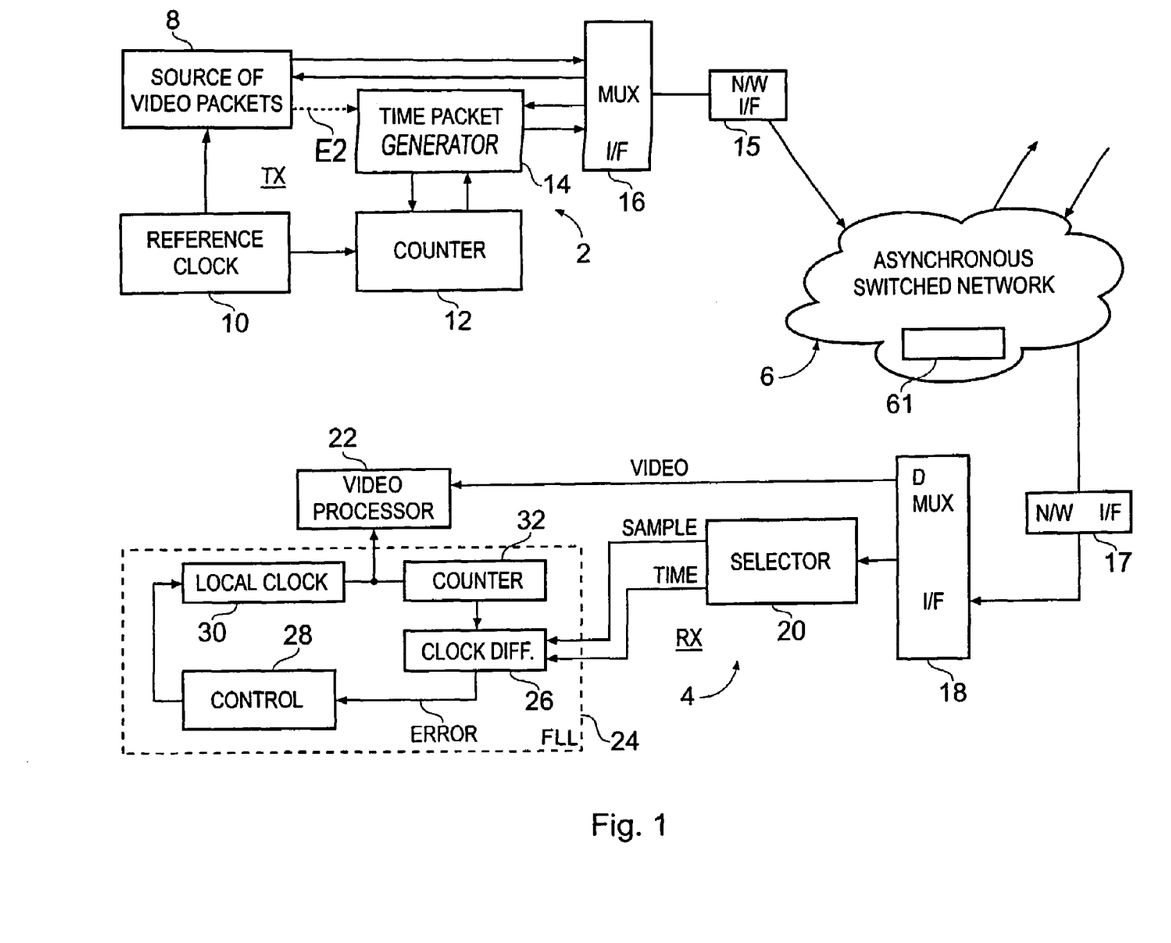
FIG. 1 is a schematic block diagram of an illustrative asynchronous switched network according to the invention to which are coupled a transmitter which transmits video and associated clock data onto the network and a corresponding receiver.

Referring to FIG. 1, in this example video is transmitted from a transmitter 2, at one node of an asynchronous packet switched network 6, over the network to one or more receivers 4 (only one shown) at other nodes thereof. The transmitter 2 and the receivers 4 may be, or form part of, network cards. The network in this example is an Ethernet network but could be any other asynchronous switched packet network for example a Token Ring network. The network 6 includes a switch 61 which duplicates the video (and time packets described below) supplied by the transmitter 2 and distributes it to the receivers 4. The video is produced synchronously with a reference clock 10 by a source 8. In this example the video comprises SDI frames of 1440 video samples per line and 625 lines per frame produced synchronously with a 27 MHz sampling clock. To decode the video at the receiver 4, the local clock 30 needs to operate at 27 MHz (+/− a small tolerance). Thus the local clock 30 needs to be frequency synchronised with the reference clock 10.

Figure 3:
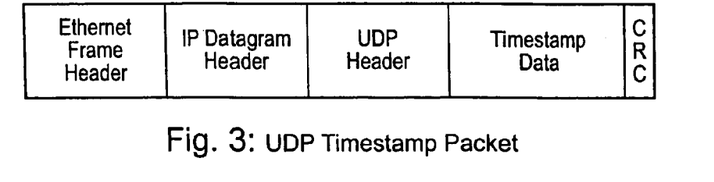
FIG. 3 is a schematic diagram illustrating an example of a timing packet according to the invention.

In the example of FIG. 1, the video data is transmitted across the network 6 as packets in conventional manner. In accordance with an example of the invention time packets, an example of which is shown in FIG. 3, are also produced, separately from the video and also transmitted across the network 6. The video packets and time packets are transmitted in separate channels but are associated one with the other by having the same source and destination addresses.

Referring again to FIG. 1, the transmitter 2 comprises the source 8 of video packets 8 and the reference clock 10. The video packets are received by an interface and multiplexer 16 which supplies the packets to a network interface 15 The network interface 15 sends the video packets across the network in conventional manner. A counter 12 counts the clock ticks of the reference clock. A time packet generator 14, which operates under the control of the interface 16 obtains the reference count of the counter 12 at any time when the network has spare capacity to transmit a time packet and places it into the time stamp data field (see FIG. 3) of a time packet which is then sent across the network. The time data is the time indicated by the reference clock at the time the packet is sent. The time packets are produced including reference counts and transmitted to a receiver 4 at frequent, but varying, intervals.

The receiver 4 comprises a network interface 17 corresponding to interface 15, and an interface 18 corresponding to the interface 16, which feeds video packets to a video processor 22 and time packets to a time packet selector 20. The selector 20 extracts the timing data from the timing packet and also supplies a sampling signal indicating the time at which the packet was received by the selector 20. The timing data and sampling signal are supplied to a Frequency Locked Loop (FLL) which includes, and controls, a local clock 30. The FLL is a sample data control system. Details of the clocking of samples through the FLL are omitted because such details are not of relevance to the understanding of the present invention and within the normal skill of FLL designers.

Figure 4:
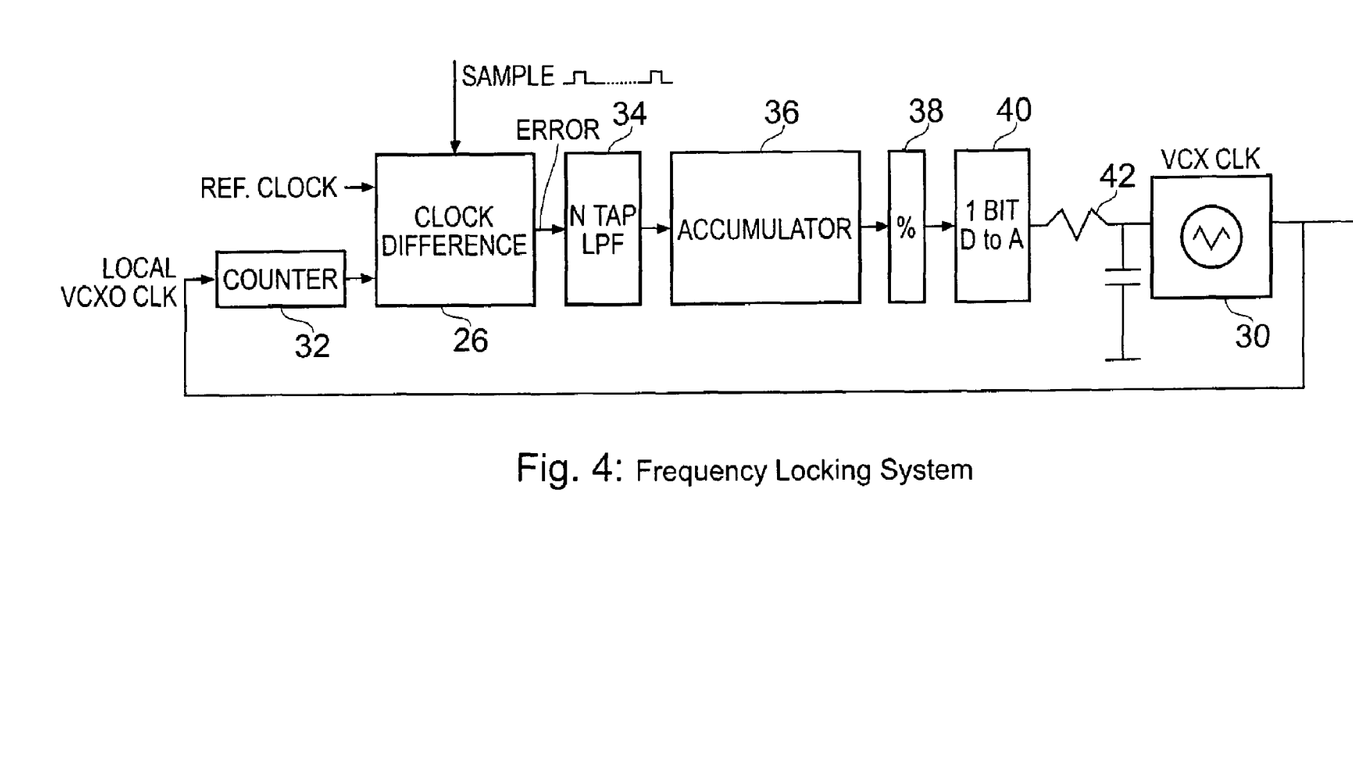
FIG. 4 is a schematic block diagram of an illustrative frequency locked loop (FLL) used in the receiver of FIG. 1.
Figure 5:
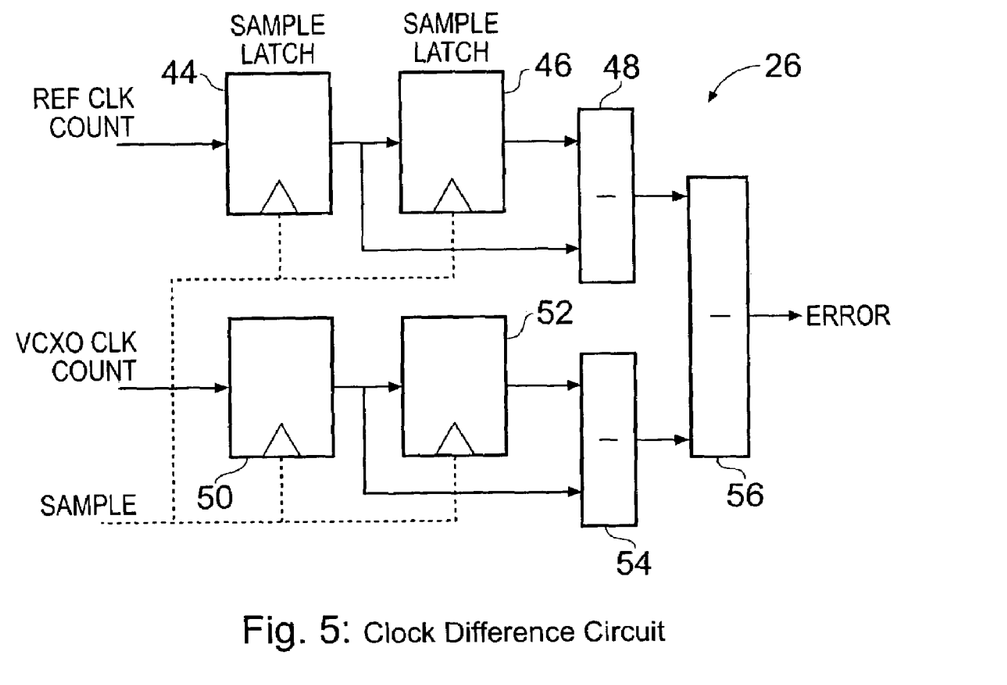
FIG. 5 is a schematic block diagram of an illustrative clock difference circuit used in the FLL of FIG. 4.

The video processor 22 requires the local clock 30 to operate at the same frequency 27 MHz as the reference clock 10 to correctly process the video. As shown in FIGS. 1 and 4, the FLL comprises a counter 32 which counts the ticks of the local clock 30 to produce a local count and a clock difference stage 26 which is shown in FIG. 5. The clock difference stage 26 forms the difference of first and second differences. The first difference is the difference of the reference counts of successive time packets. The second difference is the difference of the corresponding local counts produced at the time of reception of the reference counts. The clock difference stage is described in more detail below with reference to FIG. 5.

Figure 2:
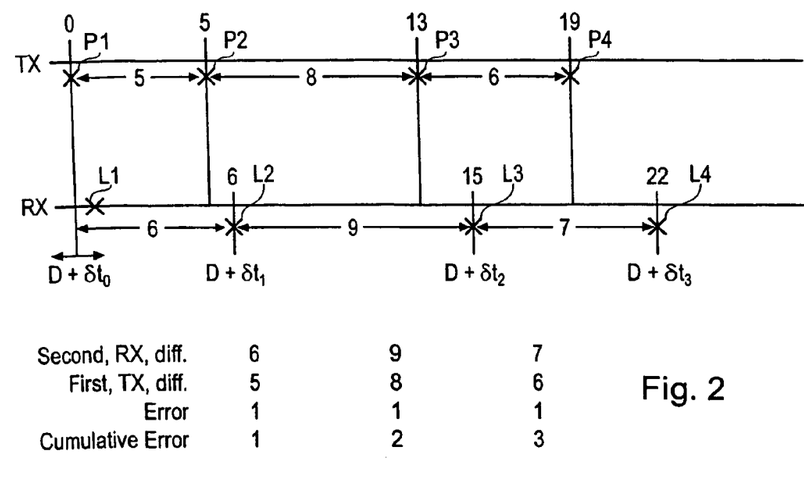
FIG. 2 is a schematic timing diagram illustrating the operation of the network of FIG. 1 in respect of timing packets.

By way of explanation, attention is invited to FIG. 2. The reference and local clocks are ideally operating at exactly 27 MHz. However in practice one or both operates with a (small) frequency error. The local clock must operate at the same frequency (+/− a very small tolerance) as the reference clock. Assume for example that the local clock operates at a slightly higher frequency than the reference clock. The transmitter transmits time packets P1 to P4 at irregular intervals. At least one, and preferably a plurality, of packets are transmitted per wrap interval of the counter 12. For example with a 27 MHz clock and a 32 bit counter 12, the wrap interval is 159 seconds and at least one packet is transmitted every 159 seconds. Preferably packets are transmitted more frequently than that for example ten per second. The time packets are described in more detail below. In the example of FIG. 2, the packets P1 and P2 are transmitted at times spaced by 5 clock ticks of the reference clock 10. The packets P2 and P3 are spaced by 8 ticks and the packets P3 and P4 are spaced by 6 ticks. The packets are received by the receiver after a network delay; assume that delay is constant D. The local counts at the times of reception of the packets P1 to P4 are L1 to L4. The counts L1 and L2 are spaced by 6 local clock ticks. L2 and L3 by 9 and L3 and L4 by 7. Thus the first differences are 5, 8 and 6 and the second differences are 6, 9 and 7 indicating the local clock is operating at a higher frequency than the reference clock. The difference of the first and second differences is the error which is used by the FLL to control the frequency of the local clock.

Forming the error from the first and second differences has the following advantages. The (fixed) delay D has no effect on the error. The absolute values of the reference and local counts are of no consequence. Furthermore, if a time packet is not received it has little effect. For example assume packet P2 is not received: then count L2 is not produced. However the difference (P3−P1)=(P2−P1)+(P3−P2) and (L3−L1)=(L2−L1)+(L3−L2) so (L3−L1)−(P3−P1)=2 in the example of FIG. 2 which is the same as the cumulative error with all the packets received.

The foregoing discussion assumes that D is fixed. D is the processing delay of the network. The processing delay in the switch 61 for example is dependent on the average size of the packets switched by it. Thus D may change for instance due to a change in the size of the time packets, which results in a change in the processing delay in the network. If D changes, then stays at its new value, the change affects the difference of the first and second differences only once at the time it changes.

The foregoing discussion also ignores network jitter δt which affects the timing of reception of the timing packets at the receiver, and thus affects the corresponding local counts L. The jitter δt causes a variation in the differences in the times of arrival of the packets at the decoder 4. The jitter δt is regarded as noise. The FLL as shown in FIG. 4 includes a Low Pass Filter 34 which low pass filters the error produced by the clock difference stage 26 to reduce the jitter. The filter is for example an N tap digital filter.

Figure 6:
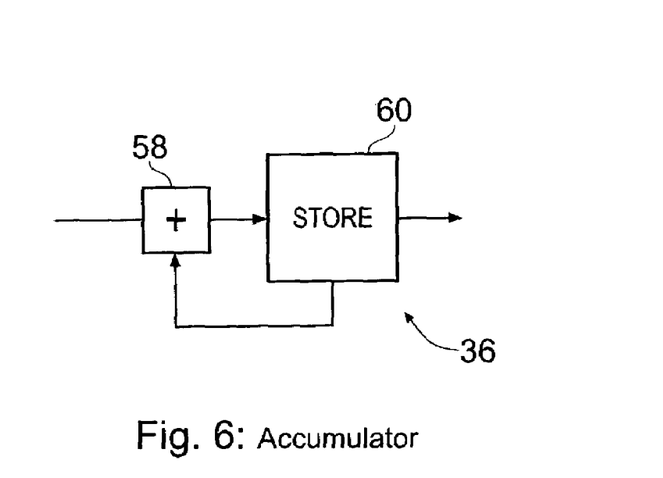
FIG. 6 is a schematic block diagram of an illustrative accumulator used in the FLL of FIG. 4.

The filter 34 is followed by an accumulator 36. An example of the accumulator is shown in FIG. 6 which is described in more detail below. The accumulator continuously accumulates the low pass filtered error. The accumulator is needed to ensure that once frequency lock occurs and thus the error is zero, then the local clock which is a voltage controlled oscillator 30 has a stable, non-zero control value applied to it to prevent "hunting". By way of explanation assume that the local clock operates at 27 MHz+X Hertz with zero control input. In the absence of the accumulator, when lock is achieved at 27 MHz, then the error and thus the control input is zero so the clock tends to drift towards operating at 27 MHz+X. By providing the accumulator, the accumulated error signal forces the clock to operate at frequency lock and when that is achieved the error into the accumulator becomes zero and thus the accumulated value stays constant but non-zero.

The accumulator is followed by a divider 38 which reduces the sensitivity of the clock to small fluctuations (e.g. due to noise) at the output of the accumulator.

The divider 38 is followed by a digital to analogue converter 40 for producing an analogue control value for the voltage controlled oscillator 30. The converter is preferably a single bit converter followed by an RC stage 42 to remove high order harmonics produced by the converter.

The filters 34 and 42, the accumulator 36 and the divider 38 together define the time constant and loop gain of the FLL. The time constant defines the time taken by the FLL to achieve lock. To minimise that time, it is preferable to use the known technique of varying the Low Pass filter 34 and the loop divider 38 to firstly achieve fast but coarse lock and then fine but slower lock.

Time Packet, FIG. 3.

In this first example the time packet contains as data only the time data. The Ethernet packet of FIG. 3 comprises an Ethernet frame header, followed in order by an IP datagram header, a UDP header, timestamp data which is the reference count mentioned above, and a CRC. The packet contains as address data at least the destination address of the receiver(s) 4. The packet may contain both the source address of the transmitter 2 and the destination address of the receiver(s) to which the transmitter is transmitting. The packet includes data which identifies it as a time packet. That data may be included in one or more of the headers in known manner.

Various types of address data may be provided depending on different operating modes.

In a point to point operating mode in which one transmitter sends data to one selected receiver, the destination address is an address solely of the selected receiver.

In a one to many operating mode in which one transmitter sends data to a group of many receivers, the destination addresses of all the receivers is included (or if they have a group address, the address of the group is included).

In a one to all operating mode in which data is broadcast from the transmitter to all receivers on the network, the address data is a broadcast address which is recognised as applying to all receivers.

The network switch 61 decodes the address data. In the broadcast and group operating modes, it receives one packet from the transmitter and duplicates that packet for transmission to all the receivers designated by the address data.

Clock Difference Stage 26, FIG. 5.

The illustrative clock difference circuit of FIG. 5 comprises four data latches 44, 46, 50 and 52. The reference count extracted from the time packet is latched into latch 48 in response to the sampling signal which indicates the time at which the selector 20 received the packet. The sampling signal also causes the latch 50 to latch the local count of the counter 28 of the FLL. The previous contents of the latches 44 and 50 are latched into the subsequent latches 46 and 52 in response to the sampling signal. Thus referring to FIG. 2, by way of example, latch 44 may contain count P2, latch 46 may contain count P1, and the latches 50 and 52 contain corresponding counts L2 and L1 respectively. A subtractor 48 forms the difference (i.e the first difference mentioned above) of the reference counts in the latches 44 and 46 e.g. P2−P1. A subtractor 54 forms the difference (i.e. the second difference mentioned above) of the local counts in the latches 50 and 52, e.g. L2−L1. A subtractor 56 forms the difference of the first and second differences. The output of the subtractor 56 is the error which controls the local clock 30.

Accumulator 36, FIG. 6

The illustrative accumulator of FIG. 6 comprises an adder 58 and a store 60. The adder adds the value of the current error (as processed by the filter 34) to the content of the store 60. The store contains the cumulative error shown in FIG. 2.

Preferably (and practically) the maximum value storable in the accumulator 36 is limited but the limit is placed outside the normal operating range of the FLL.

1 Bit D to A converter 40, FIG. 4

This may be a simple pulse width modulator or a random dither module. A random dither module requires a shorter RC time constant (42) when operating at the centre of its range.

Video Packets

Figure 7:
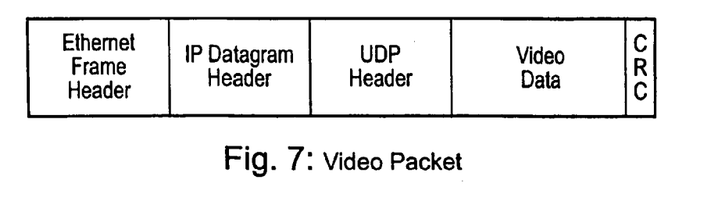
FIG. 7 is a schematic diagram illustrating an example of a video packet.

In the first example, the video packets are transmitted across the network 6 separately from the timing packets. The video packets include timing data to enable the video sequence they represent to be correctly reassembled by the video processor 22 at the receiver 4. As shown in FIG. 7, the video packets have the same basic structure as the timing packets. The packet includes data which identifies it as a video packet. That data may be included in one or more of the headers in known manner Video Processor 22, FIG. 1.

The video processor 22 may be any video processor including, for example, a monitor, an editor, a special effects machine, and/or a VTR.

Sending timing packets separately from video packets allows timing packets to be broadcast so that all video processors on the network have local clocks frequency synchronised with the reference clock, but also allows video to be sent point to point.

SECOND EXAMPLE

In the first example, the time packets are sent separately from the video packets.

Figure 8:
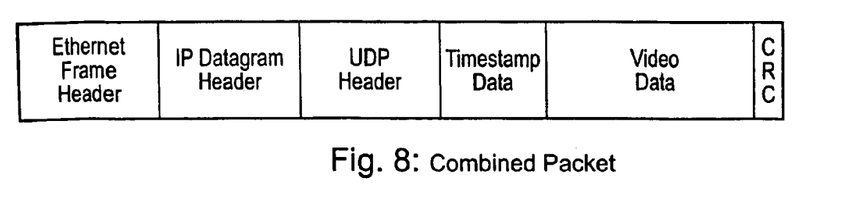
FIG. 8 is a schematic diagram illustrating an example of a timing and video packet according to the invention.

Referring to FIG. 8, the time data and the video data may be combined in one packet with common address data. The packet includes headers as described with reference to FIG. 3 or 7. The packet includes data which identifies it as a combined time and video packet. That data may be included in one or more of the headers in known manner. The time stamp data field which contains a small amount of data precedes the video data field which contains a much greater amount of data. A video sequence is transmitted using many packets. The time data may be included in only some, but not all, of the packets. The time data may be included in a video packet at frequent, but varying, intervals at times when the network has spare capacity as described above.

Referring to FIG. 1, the a combined video and time packet is generated in the source 8 but the time stamp data field is empty. The packet is fed to the block 14 via the connection E2 shown by a dashed line. The block 14 fills the time stamp data field with the time stamp data at the moment the combined packet is launched onto the network under the control of the multiplexer 16.

Modifications

Whilst the foregoing describes an example of the invention in relation to an Ethernet network, it may be used in any asynchronous switched network e.g. a Token Ring network. The network 6 may be a wired or wireless network or a combination of both wired and wireless.

Whilst the foregoing describes an example of the invention in relation to video, it may be used with any data which is transmitted across an asynchronous network and requires synchronisation of clocks at the transmitter and the receiver(s).

The transmitter 2 and the receiver 4 may be implemented as hardware. They may alternatively be implemented by software in a suitable data processor or as a mixture of software and hardware. A preferred implementation uses programmable gate arrays. It is envisaged that the present invention includes a computer program which when run on a suitable data processor implements the invention.

It will be appreciated that the embodiment of the present invention described above are concerned with frequency synchronisation of clocks. Phase synchronisation of clocks is a different issue which is not addressed by the embodiments although they may be used in conjunction with a phase synchroniser.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of synchronising a frequency of a local clock of a local data processor in communication with an asynchronous switched packet network to a frequency of a reference clock of a source data processor also coupled to the network, the method comprising the steps of:

sending, to the local data processor from the source data processor across the network, data packets including a field containing a destination address of the local processor and a field containing reference clock data indicating a time at which a data packet is launched onto the network; and controlling the frequency of the local clock in dependence on the reference clock data and times of arrival of the data packets by controlling the local clock in dependence on an error signal which is dependent on a) a difference between the reference clock data in successively received data packets containing the reference clock data and b) a difference between local clock data indicating the local clock time at times of receipt of said data packets.

2. A method according to claim 1, wherein said data packets contain video data.

3. A method according to claim 1, further comprising:
sensing, with the source data processor, when the network has capacity to send timing data; and
sending the timing data when said capacity exists.

4. A method according to claim 1, further comprising:
counting, with a reference counter included in the source processor, ticks of the reference clock and said reference clock data is a count in the reference counter at a time at which a data packet containing the reference clock data is sent across the network.

5. A method according to claim 4, further comprising:
controlling the local clock in dependence on an error signal which is dependent on a) a difference between the reference clock data in successively received data packets containing the reference clock data and b) a difference between local clock data indicating the local clock time at times of receipt of said data packets containing the reference clock data; and
counting, with a local counter included in the local processor, which counts ticks of the local clock and said local clock data is a count in the local counter of the local processor at a time of receipt of a data packet containing reference clock data.

6. A method according to claim 5, further comprising:
low pass filtering said error signal.

7. A method according to claim 6, further comprising:
accumulating the filtered error signal and controlling the local clock in dependence on the accumulated filtered error signal.

8. A method according to claim 1, wherein the network comprises a plurality of local processors having respective addresses, the method comprising sending said data packets containing the reference clock data to two or more of the local processors.

9. A method according to claim 8, further comprising:
sending, to a group of the local processors having a group address, data packets containing the reference clock data each including a field containing the group address, and a field containing the said reference clock data.

10. A method according to claim 8, further comprising:
sending, to local processors of the network having a broadcast address, data packets containing the reference clock data that each include a field containing the broadcast address and a field containing said reference clock data.

11. A method according to claim 1, wherein if there is a failed data packet which is not successfully transmitted at the source data processor or not successfully received at the local data processor, then the error signal is dependent on a) a difference between the reference clock data of a first data packet received prior to the unsuccessful transmission or reception of the failed data packet and the reference clock data in a second data packet received after the unsuccessful transmission or reception of the failed data packet and b) a difference between local clock data indicating the local clock time at times of receipt of said first data packet and said second data packet.

12. A data processor comprising:
a reference clock;
a source of data processed synchronously with the reference clock;
a generator of data packets including said synchronously processed data, reference clock data and an address field containing address data indicating the destination of a data packet; and
an interface for sending the data packets across an asynchronous switched network to a receiving data processor, the reference clock data indicating a time at which a data packet is launched onto the network,
wherein the receiving data processor has a local clock and a control system for controlling a frequency of the local clock in dependence on the reference clock data and times of arrival of the data packets at the data processor by controlling the local clock in dependence on an error signal which is dependent on a) a difference between the reference clock data in successively received data packets containing the reference clock data and b) a difference between local clock data indicating the local clock time at times of receipt of said data packets.

13. A data processor according to claim 12, further comprising:
a reference counter which counts ticks of the reference clock and said reference clock data is a count in the counter at a time a data packet containing the reference clock data is launched onto the network.

14. A data processor according to claim 12, further comprising:
a sensing unit configured to sense when the network has capacity to send timing data and to cause the data processor to send the timing data when said capacity exists.

15. A network card comprising a data processor according to claim 12.

16. A data processor comprising:
a local clock; and
an interface configured to receive, from an asynchronous switched network, data packets which contain data produced synchronously with a reference clock and timing data indicating a reference clock time at a time a data packet was launched onto the network and an address field containing address data indicating an address of the data processor, and configured to pass the timing data to a control system for controlling a frequency of the local clock in dependence on the reference clock data and times of arrival of the data packets at the data processor by controlling the local clock in dependence on an error signal which is dependent on a) a difference between the reference clock data in successively received data packets containing the reference clock data and b) a difference between local clock data indicating the local clock time at times of receipt of said data packets.

17. A data processor according to claim 16, wherein the control system comprises a counter which counts ticks of the local clock and said local clock data is a count in the counter at a time of receipt of a data packet containing reference clock data.

18. A data processor according to claim 16, further comprising:
a low pass filter configured to filter said error signal.

19. A data processor according to claim 18, further comprising:
an accumulator configured to accumulate the filtered error signal and controlling the local clock in dependence on the accumulated filtered error signal.

20. A data processor according to claim 16, further comprising:
a data processing device configured to process data synchronously with the local clock and wherein said interface is configured to receive data from the network and pass it to the data processing device.

21. A data processor according to claim 20, further configured to receive data packets containing both timing data and said data and to pass the timing data to the control system and the data to the data processor.

22. A data processor according to claim 20, wherein said data processing device is a video processing device.

23. A network card comprising a data processor according to claim 16.

24. An asynchronous switched network comprising:
a plurality of nodes to at least one of which is coupled a source data processor comprising a reference clock, a source of data processed synchronously with the reference clock, a generator of data packets comprising said synchronously processed data, reference clock data and an address field containing address data indicating a destination of a packet, and an interface for sending the data packets across an asynchronous switched network, the reference clock data indicating a time at which a data packet is launched onto the network, and the at least one of the plurality of nodes is connected to a local data processor comprising a local clock, an interface for receiving, from an asynchronous switched network, data packets which contain timing data each indicating a reference clock time at the time a data packet was launched onto the network and an address field containing address data indicating an address of the source data processor, and for passing the timing data to a control system for controlling a frequency of the local clock in dependence on the reference clock data and times of arrival of the data packets at the local data processor and linking the said source and local data processors by controlling the local clock in dependence on an error signal which is dependent on a) a difference between the reference clock data in successively received data packets containing the reference clock data and b) a difference between local clock data indicating the local clock time at times of receipt of said data packets.

25. An asynchronous switched network according to claim 24, further comprising:

a plurality of local data processors connected to respective nodes of the network, each of said local data processors comprising a local clock, an interface for receiving, from an asynchronous switched network, packets containing the reference clock data which contain timing data each indicating a reference clock time at the time a data packet was launched onto the network and an address field containing address data indicating the address of a source data processor, and for passing timing data to a control system for controlling a frequency of the local clock in dependence on the reference clock data and times of arrival of the data packets containing the reference clock data at a local data processor, the source data processor being operable to send data packets containing the reference clock data to two or more local processors.

26. An asynchronous switched network according to claim 25, wherein a group of local processors has a group address and the source data processor is operable to send data packets containing the reference clock data to the group of local processors, the data packets containing the reference clock data having a field containing group addresses and a field containing the said reference clock data.

27. An asynchronous switched network according to claim 25, wherein the source data processor configured to send data packets containing the reference clock data to local data processors connected to the network, the data packets containing the reference clock data each include a field containing a broadcast address and a field containing reference clock data.

* * * * *